United States Patent
Heo et al.

(10) Patent No.: US 7,573,854 B2
(45) Date of Patent: Aug. 11, 2009

(54) METHOD AND APPARATUS FOR PROVIDING UPLINK PACKET DATA SERVICE IN ASYNCHRONOUS WCDMA SYSTEM

(75) Inventors: Youn-Hyoung Heo, Suwon-si (KR); Ju-Ho Lee, Suwon-si (KR); Sung-Ho Choi, Suwon-si (KR); Young-Bum Kim, Seoul (KR); Yong-Jun Kwak, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 488 days.

(21) Appl. No.: 10/923,391

(22) Filed: Aug. 20, 2004

(65) Prior Publication Data

US 2005/0157687 A1 Jul. 21, 2005

(30) Foreign Application Priority Data

| Aug. 20, 2003 | (KR) | ................... 10-2003-0057735 |
| May 6, 2004 | (KR) | ................... 10-2004-0031894 |
| Jun. 29, 2004 | (KR) | ................... 10-2004-0049751 |
| Aug. 17, 2004 | (KR) | ................... 10-2004-0064898 |

(51) Int. Cl.
   *H04B 7/216* (2006.01)
(52) U.S. Cl. .............. 370/335; 370/329; 370/342; 370/441; 375/140; 455/450
(58) Field of Classification Search .............. 370/252, 370/342, 522, 278, 329, 412, 335, 319, 355, 370/441, 320; 375/148, 140, 145, 130; 455/450; 522/320

See application file for complete search history.

(56) References Cited

U.S. PATENT DOCUMENTS

| 6,646,993 | B1* | 11/2003 | Davies et al. ............ 370/252 |
| 6,788,959 | B2* | 9/2004 | Jokinen et al. ........... 455/552.1 |
| 6,999,439 | B2* | 2/2006 | Takano ................... 370/335 |
| 7,167,487 | B2* | 1/2007 | Herrmann ............... 370/477 |
| 7,187,708 | B1* | 3/2007 | Shiu et al. ............... 375/148 |
| 2001/0021229 | A1* | 9/2001 | Belaiche ................. 375/295 |
| 2003/0074476 | A1 | 4/2003 | Kim et al. |

(Continued)

FOREIGN PATENT DOCUMENTS

JP 2002-208910 7/2002

(Continued)

*Primary Examiner*—George Eng
*Assistant Examiner*—Brandon J Miller
(74) *Attorney, Agent, or Firm*—The Farrell Law Firm, LLP (57) ABSTRACT

Disclosed is a method and apparatus for providing uplink packet data services through an E-DCH in an asynchronous WCDMA system. A transport block size (TBS) for transmitting uplink transport channel data is determined. A combination of a spreading factor and a modulation scheme for uplink channel data transmission, corresponding to the determined TBS, is selected according to transmittable physical channel data bit sizes and puncturing limit values. The TBS is transmitted by incorporating it into control information of the uplink transport channel data. The modulation scheme and spreading factor combination is determined based on a physical channel data bit size that maximizes transmission efficiency and minimizes the number of punctured bits, without requiring an additional physical channel in transmitting the uplink data having the TBS. This method maximizes uplink transmission efficiency to save transmission resources and reduces signaling overhead required to transmit E-DCH control information.

48 Claims, 7 Drawing Sheets

U.S. PATENT DOCUMENTS

| | | | |
|---|---|---|---|
| 2003/0123409 A1* | 7/2003 | Kwak et al. | 370/335 |
| 2003/0198210 A1* | 10/2003 | Haim | 370/342 |
| 2005/0018614 A1* | 1/2005 | Kiran | 370/252 |
| 2005/0185594 A1* | 8/2005 | Horneman et al. | 370/252 |
| 2005/0220047 A1* | 10/2005 | Baey et al. | 370/315 |

FOREIGN PATENT DOCUMENTS

| | | |
|---|---|---|
| JP | 2002-345017 | 11/2002 |
| JP | 2003-101458 | 4/2003 |

* cited by examiner

METHOD AND APPARATUS FOR PROVIDING UPLINK PACKET DATA SERVICE IN ASYNCHRONOUS WCDMA SYSTEM

PRIORITY

This application claims priority to four applications entitled "Method And Apparatus For Providing Uplink Packet Data Service In Asynchronous WCDMA System" each filed in the Korean Intellectual Property Office on Aug. 20, 2003 and assigned Serial No. 2003-57735, filed on May 6, 2004 and assigned Serial No. 2004-31894, filed on Jun. 29, 2004 and assigned Serial No. 2004-49751, and filed on Aug. 17, 2004 and assigned Serial No. 2004-64898, the contents of each of which are hereby incorporated herein by reference.

BACKGROUND OF THE INVENTION

1. Field of the Invention

The present invention relates to asynchronous Wideband Code Division Multiple Access (WCDMA) communications, and more particularly to a method and apparatus for efficiently determining and transmitting control information required for transmitting Enhanced Uplink Dedicated Channel (EUDCH or E-DCH) data.

2. Description of the Related Art

A Universal Mobile Telecommunication Service (UMTS) system is a 3G ($3^{rd}$ Generation) mobile communication system which is based on Global System for Mobile (GSM) communications (i.e., a European mobile communication system), and uses WCDMA technology. The UMTS system provides consistent services enabling mobile phone and computer users to perform packet-based transmissions of text, digitized voice, video, and multimedia data at a high rate of more than 2 Mbps no matter where in the world they are located. The UMTS system uses a concept called a "virtual connection" which is a packet-switched connection using a packet protocol such as the Internet Protocol (IP), and which is always available to any other end point in the network.

The UMTS system uses an Enhanced Dedicated Channel (E-DCH) to enhance packet transmission performance in uplink communication from User Equipment (UE) to a Node B (also referred to as a base station). The E-DCH, which is enhanced from the general DCH to support more stable high-speed data transmission, is a transport channel supporting technologies such as Adaptive Modulation and Coding (AMC), Hybrid Automatic Retransmission Request (HARQ), and Node B controlled scheduling.

The AMC is a technology for increasing the utilization efficiency of a data channel by adaptively determining different modulation and coding schemes of the data channel according to channel states between a Node B and a UE. The AMC uses Modulation and Coding Scheme (MCS) levels indicating various combinations of modulation and coding schemes. The AMC increases overall channel utilization efficiency by adaptively determining the MCS level according to the channel state between the Node B and the UE.

The HARQ is a technique in which a data packet is retransmitted for error compensation if an error occurs in an initially transmitted data packet. The receiver receives and decodes the retransmitted packet by soft-combining it with the initially received data packet. The HARQ technique can be classified into Chase Combining (CC), in which the same bits as those of the initially transmitted packet are retransmitted when an error occurs in the initially transmitted packet, and Incremental Redundancy (IR) in which different bits from those of the initially transmitted packet are retransmitted when an error occurs in the initially transmitted packet.

The Node B controlled scheduling is a technique used for data transmission using an E-DCH in a system with the E-DCH established. In this technique, a Node B determines a maximum allowed data rate of a UE and determines if the UE is permitted to transmit uplink data, and informs the UE of the determination. Based on the determination information received from the Node B, the UE determines a possible uplink E-DCH data rate. When this technique is used, an MCS level is adaptively determined based on channel states between the UE and the Node B to increase channel utilization efficiency.

Figure 1:
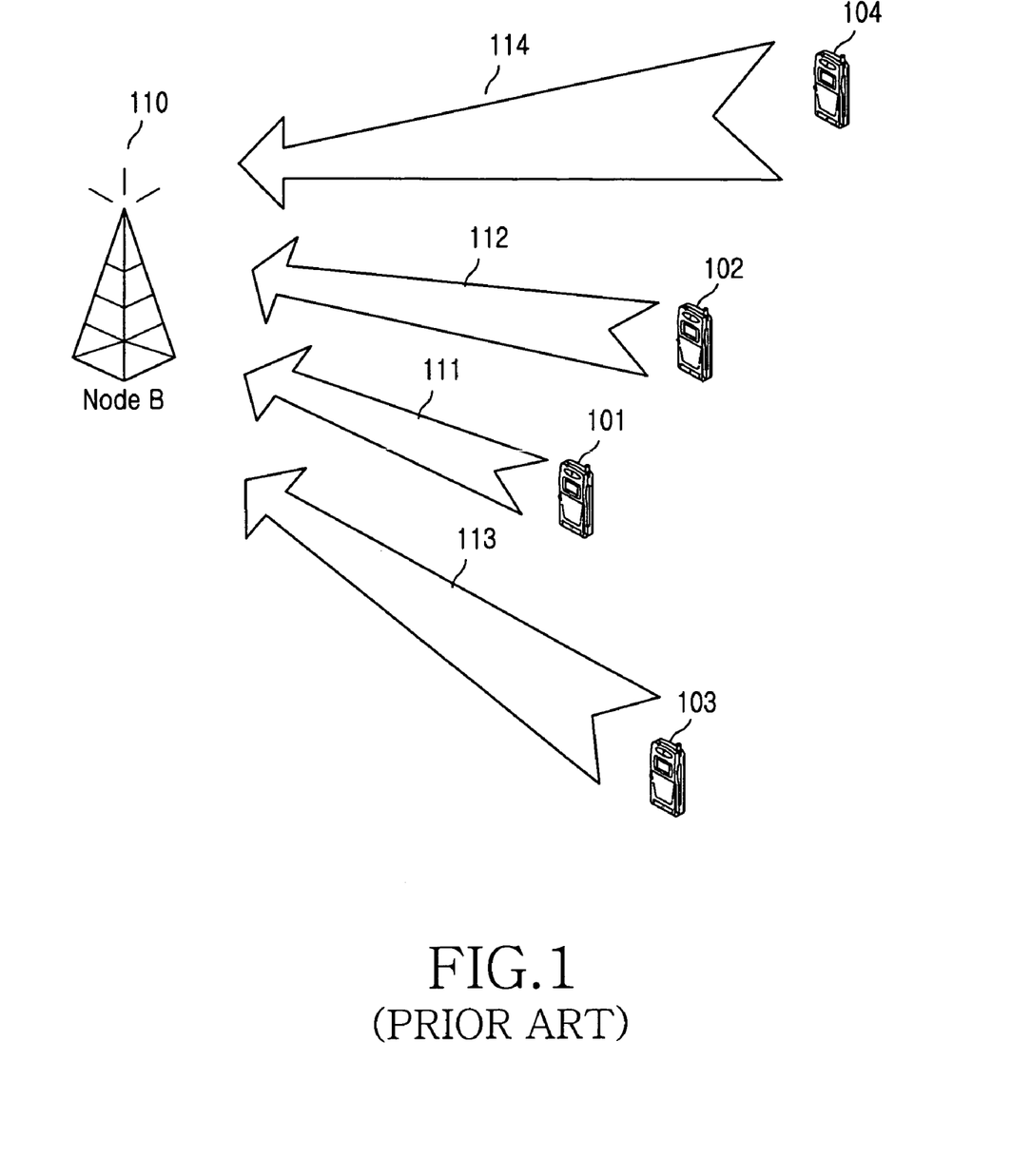
FIG. 1 is a conceptual diagram illustrating typical uplink data transmission.

FIG. 1 is a conceptual diagram illustrating data transmission through an E-DCH in a radio link.

In FIG. 1, reference numeral 110 denotes a Node B supporting the E-DCH, and reference numerals 101, 102, 103 and 104 are UEs receiving E-DCH signals. The Node B 110 detects channel states of the E-DCHs used by the UEs 101 to 104, and schedules data transmission of each of the UEs. To increase the overall system performance, this scheduling is performed in such a manner that a low data rate is allocated to the UE 104 furthest from the Node B 110, and a high data rate is allocated to the UE 101 near the Node B 110, while preventing a Rise Over Thermal (ROT) value of the Node B 110 from exceeding a target value.

Figure 2:
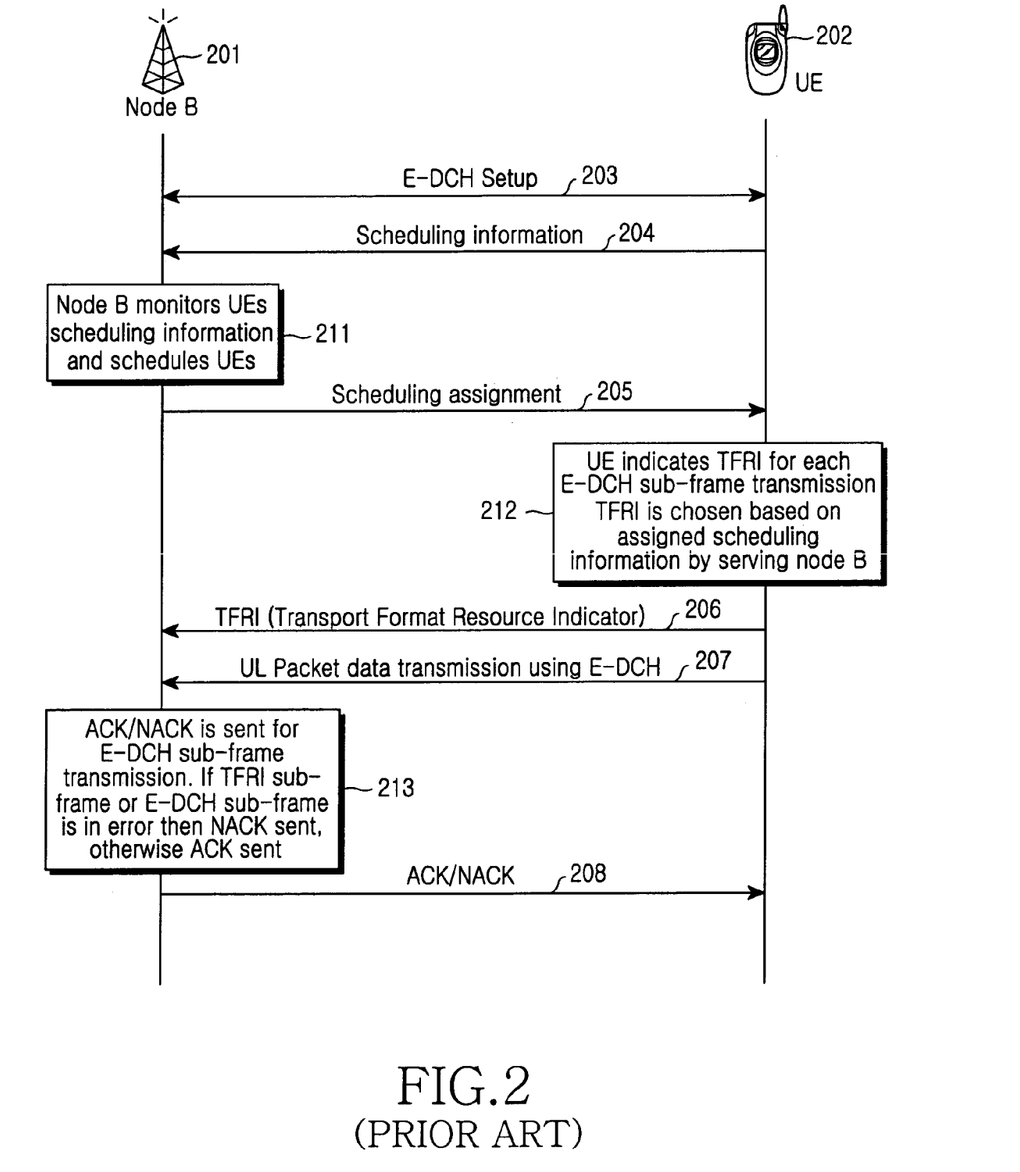
FIG. 2 is a message flow diagram illustrating the procedure for transmission and reception through an E-DCH.

FIG. 2 is a message flow diagram illustrating the procedure for transmission and reception through an E-DCH.

First, at step 203, the Node B 201 and the UE 202 set up an E-DCH therebetween. This setup procedure includes the transmission of messages through a dedicated transport channel. If the E-DCH is set up, the UE 202 notifies the Node B 201 of state information (i.e., scheduling information) at step 204. This state information includes, for example, the amount of data awaiting transmission stored in a buffer, available UE transmit power, and UE transmit power information indicating uplink channel information.

The Node B 201 and receives monitors the state information of the UE 202 at step 211. At step 211, the Node B 201 schedules the UE 202 to perform uplink packet transmission, and transmits scheduling assignment information to the UE 202. The scheduling assignment information includes a data rate, transmission timing, etc.

Using the scheduling allocation information, the UE 202 determines, at step 212, a Transport Format (TF) of an E-DCH for transmission in the uplink, and transmits the determined TF information to the Node B at step 206 and also transmits uplink (UL) data to the Node B at step 207 through the E-DCH. The TF information includes a Transport Format Resource Indicator (TFRI) that indicates information required to demodulate the E-DCH. The UE 202 performs the uplink data transmission of step 207 based on an MCS level selected according to the channel state and the data rate allocated by the Node B 201.

At step 213, the Node B 201 determines if an error exists in the data and the TFRI received from the UE 202. At step 208, the Node B 201 transmits Non-Acknowledgement (NACK) information to the UE 202 through an ACK/NACK channel if an error exists, and transmits Acknowledgement (ACK) information to the UE 202 through an ACK/NACK channel if no error exists. If the ACK information is transmitted to the UE 202, the data transmission is completed, so that the UE 202 transmits new user data to the Node B 201 through the E-DCH. On the other hand, if the NACK information is transmitted to the UE 202, the UE 202 retransmits data containing the same contents as transmitted at step 207 to the Node B 201 through the E-DCH.

Since the UE uses a different MCS level in each transmission through the E-DCH, and uses different Spreading Factors (SFs) according to the size of data to transmit, the Node B must normally acquire control information (i.e., TFRI) of packets of uplink data to normally demodulate the uplink data.

The TFRI information required to demodulate the uplink data includes a Modulation Format (MF), a Spreading Factor (SF), and a Transport Block Size (TBS) of the uplink data. The E-DCH transmission employs modulation formats such as Binary Phase Shift Keying (BPSK), Quadrature PSK (QPSK) and 8-ray PSK (8-PSK) because it is very important to decrease Peak to Average power Ratio (PAR) in the E-DCH transmission. The E-DCH transmission can use a variety of Orthogonal Variable Spreading Factors (OVSF) in the uplink because there is no limitation on the use of code resources in the uplink. The E-DCH transmission provides a peak data rate of 2 Mbps, and supports various TBSs to provide various services.

SUMMARY OF THE INVENTION

The number of physical layer bits required to transmit all of the control information items through physical layer signaling is 11, and distributed as follows:

MF[2],TBS[6],SF[3]

These control information items directly cause interference in the uplink since they are transmitted using the uplink resources. Thus, there is a need to provide a method for transmitting the control information such as the MF, TBS, and SF, required to demodulate the E-DCH data, to the Node B more efficiently using a small number of bits.

Therefore, the present invention has been made in view of at least the above problems, and it is an object of the present invention to provide a method and apparatus for efficiently determining and transmitting control information required for a Node B to demodulate data received from a UE through an Enhanced Dedicated Channel (E-DCH) in the uplink in an asynchronous WCDMA communication system.

It is another object of the present invention to provide a method and apparatus for efficiently determining and transmitting control information required to demodulate received data while decreasing the uplink overhead of an E-DCH, which enhances uplink packet transmission performance of the system through AMC and Node B-controlled scheduling.

It is yet another object of the present invention to provide a method and apparatus for efficiently transferring TFRI information of an E-DCH in the uplink.

In accordance with one aspect of the present invention, the above and other objects can be accomplished by the provision of a method for providing an uplink packet data service method in an asynchronous Wideband Code Division Multiple Access (WCDMA) system, the method including determining a Transport Block Size (TBS) for the transmission of uplink transport channel data; determining a combination of a Modulation Format (MF) and a Spreading Factor (SF) corresponding to the transport block size determined for transmission of the uplink transport channel data, based on transmittable physical channel data bit sizes and a plurality of preset Puncturing Limit (PL) values; and transmitting the transport block size by incorporating the transport block size into control information of the uplink transport channel data.

In accordance with another aspect of the present invention, there is provided an uplink packet data service apparatus in an asynchronous Wideband Code Division Multiple Access (WCDMA) system, the apparatus including a higher layer processor for determining a Transport Block Size (TBS) for transmission of uplink transport channel data; a determinator for determining a combination of a Modulation Format (MF) and a Spreading Factor (SF) corresponding to the transport block size determined for transmission of the uplink transport channel data, based on transmittable physical channel data bit sizes and a plurality of preset Puncturing Limit (PL) values; and a transmitter for transmitting the transport block size by incorporating the transport block size into control information of the uplink transport channel data.

In accordance with still another aspect of the present invention, there is provided an uplink packet data service method in an asynchronous Wideband Code Division Multiple Access (WCDMA) system, the method including receiving control information including a Transport Block Size (TBS) for reception of uplink transport channel data; determining a combination of a Modulation Format (MF) and a Spreading Factor (SF) corresponding to the transport block size, based on transmittable physical channel data bit sizes and a plurality of preset Puncturing Limit (PL) values; and receiving the uplink transport channel data using the modulation format and the spreading factor.

In accordance with yet another aspect of the present invention, there is provided an uplink packet data service apparatus in an asynchronous Wideband Code Division Multiple Access (WCDMA) system, the apparatus including a control channel receiver for receiving control information including a Transport Block Size (TBS) for reception of uplink transport channel data; a determinator for determining a combination of a Modulation Format (MF) and a Spreading Factor (SF) corresponding to the transport block size, based on transmittable physical channel data bit sizes and a plurality of preset Puncturing Limit (PL) values; and a receiver for receiving the uplink transport channel data using the modulation format and the spreading factor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, the operating principle of preferred embodiments of the present invention will be described in detail with reference to the annexed drawings. In the following description, a detailed description of known functions and configurations incorporated herein will be omitted when it may obscure the subject matter of the present invention. Also, the terms used in the following description are terms defined taking into consideration the functions obtained in accordance with the present invention. The definitions of these terms should be determined based on the whole content of this specification as a term may change in accordance with a user, a chip designer or the usual practice.

According to the present invention, when data is transmitted from a UE to a Node B through an enhanced uplink DCH in an asynchronous WCDMA system, the Node B is notified of only Transport Block Size (TBS) information indicating a transport channel data bit size, so that the Node B can obtain a Modulation Format (MF) and a Spreading Factor (SF) based on the TBS information, thereby decreasing uplink signaling overhead. To accomplish this, the UE determines an MS and an SF corresponding to a TBS. This operation will be described in detail later. The same operation is also applied when the Node B controls or determines an MS and an SF according to the TBS information received from the UE.

The following is a description of SFs that can be used for each MF when AMC technology is employed in the uplink. A physical transport format combination (of the number of OVSF codes and an MF), which can be actually used by each UE, of the supportable transport format combinations, is determined based on the capability of the UE and higher layer signaling. In an asynchronous mode, the data channel transfer rate differs according to the spreading factor (SF). Specifically, the SF decreases as the data transfer rate increases. The transfer rate is associated with the transmit data size since the transfer rate is the size of data transmittable per unit time. If the UE supports BPSK, QPSK and 8-PSK, and can use all OVSF codes, the following MF/SF combinations are possible.

$$\{(MF,SF)\}=\{(BPSK,256),(BPSK,128),(BPSK,64),\\(BPSK,32),(BPSK,16),(BPSK,8),(BPSK,4),\\(QPSK,4) \text{ and } (8\text{-PSK},4)\}$$

When compared to the BPSK, the QPSK and 8-PSK have a problem in that they have a high Peak to Average Ratio (PAR). Therefore, the use of the QPSK and 8-PSK is suitable only for transmission of a large amount of data (for example, data size greater than the size of data transmittable using (BPSK, 4)).

Figure 3:
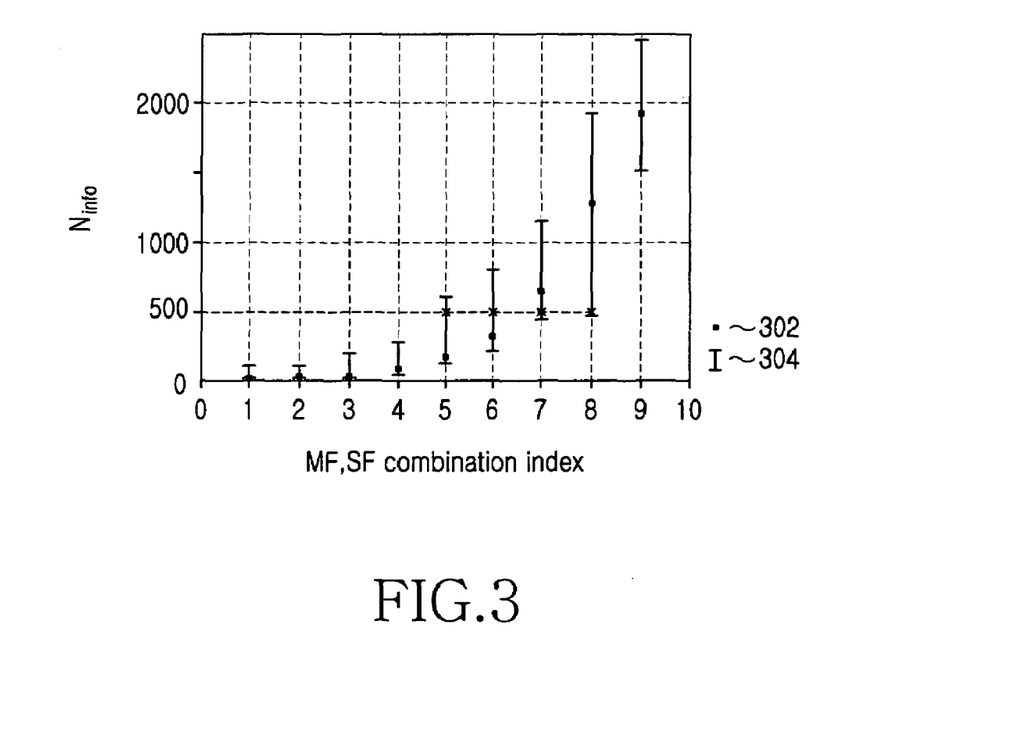
FIG. 3 illustrates transmittable data Transport Block Sizes (TBS) with respect to Modulation Format/Spreading Factor (MF/SF) combinations.

FIG. 3 illustrates transport channel data bit sizes (i.e., encoded Transport Block Sizes (TBS)) transmittable according to the MF/SF combinations.

Reference numeral 302 in FIG. 3 denotes a TBS transmittable without puncturing for each MF/SF combination, when a code rate of 1/3 is used, and reference numeral 304 denotes the range of the TBSs supportable through puncturing for each MF/SF combination when a code rate of 1/3 is used. In FIG. 3, an MF/SF combination index "1" indicates BPSK and SF=256, "2" indicates BPSK and SF=128, "3" indicates BPSK and SF=64, "4" indicates BPSK and SF=32, "5" indicates BPSK and SF=16, "6" indicates BPSK and SF=8, "7" indicates BPSK and SF=4, "8" indicates QPSK and SF=4, and "9" indicates 8-PSK and SF=4.

A code rate of information/data can be controlled according to the puncturing ratio of the information/data encoded in the encoding procedure. Thus, if there is no limitation on the puncturing ratio, various MF/SF combinations as denoted by "x" in FIG. 3 are possible for a specific data bit size (500 bits in this example). That is, if a transport block size (TBS) "$N_{info}$" of information to transmit is 500 bits, the following four MF/SF combinations can be used.

$$\{(MF,SF)\}=\{(BPSK,16),(BPSK,8),(BPSK,4) \text{ and } (QPSK,4)\}$$

The UE selects a suitable one of the four MF/SF combinations when the UE intends to transmit 500-bit information. If the UE transmits information/data of the same size using the same modulation format, the UE achieves the highest transmission efficiency when transmitting the information/data without puncturing. Thus, for data having a TBS to transmit, the UE selects an MF/SF combination, which enables transmission of the data having the TBS without puncturing if possible, from among various MF/SF combinations possible for the TBS.

Two combinations (BPSK, 4) and (QPSK, 4) can enable transmission of the 500-bit data without puncturing in the example of FIG. 3. Both the combinations have a transport block size (denoted by "302") transmittable without puncturing, which is greater than 500 bits. Although both the combinations require no puncturing in transmitting 500-bit data, it is more preferable to select the combination (BPSK, 4), which is the lower order modulation format using relatively low energy, to increase efficiency. If code resources are scarce, different MF/SF combinations may be used even for the same transport block size even if the transmission efficiency is low. However, in the uplink, it is possible to select a unique MF/SF combination with the highest transmission efficiency for each TBS since there is almost no limitation on OVSF codes available to a single UE in the uplink, as compared to the downlink.

Figure 4:
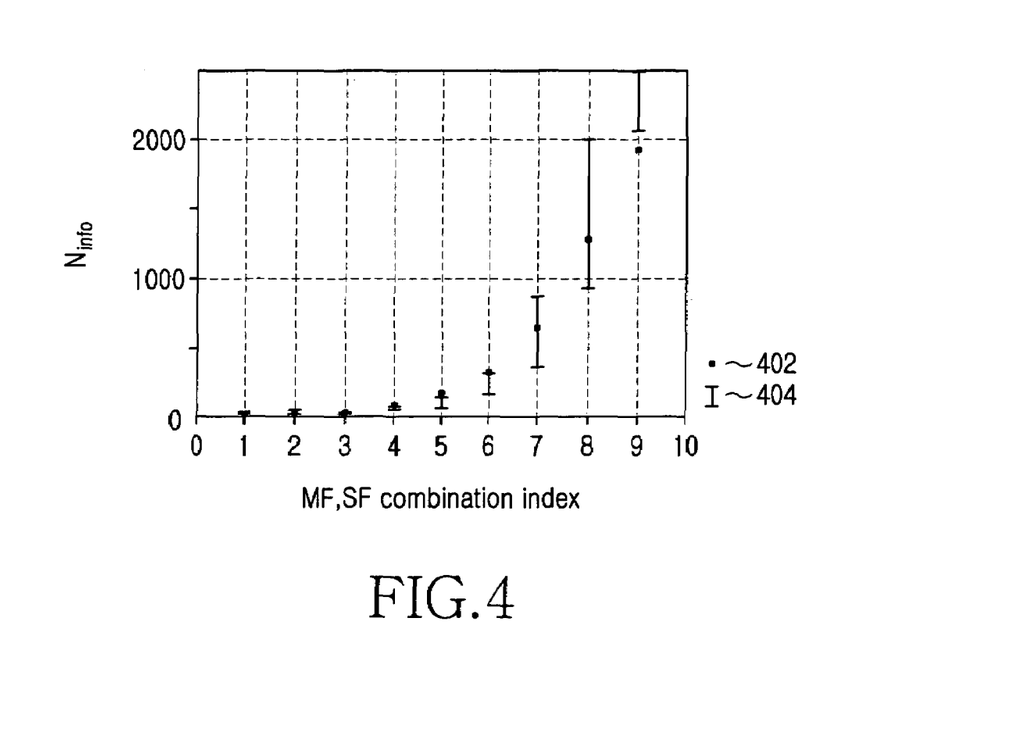
FIG. 4 illustrates one-to-one mapping between MF/SF combinations and TBSs according to a preferred embodiment of the present invention.

FIG. 4 illustrates one-to-one mapping between MF/SF combinations and TBSs according to a preferred embodiment of the present invention. In FIG. 4, reference numeral 402 denotes a TBS transmittable without puncturing for each MF/SF combination, when a code rate of 1/3 is used, and reference numeral 404 denotes the range of TBSs transmittable through puncturing for each MF/SF combination when a code rate of 1/3 is used.

As shown in FIG. 4, TBSs are mapped on a one-to-one basis to the MF/SF combinations. This mapping of information is prescribed between the UE and the Node B before the communication starts. The UE determines a combination of the modulation format (MF)/spreading factor (SF) for the transmission of E-DCH data according to a corresponding TBS, and then transmits the TFRI information containing only the TBS from among modulation parameters used in the E-DCH. The Node B detects the MF/SF combination using the TBS received from the UE.

Figure 5:
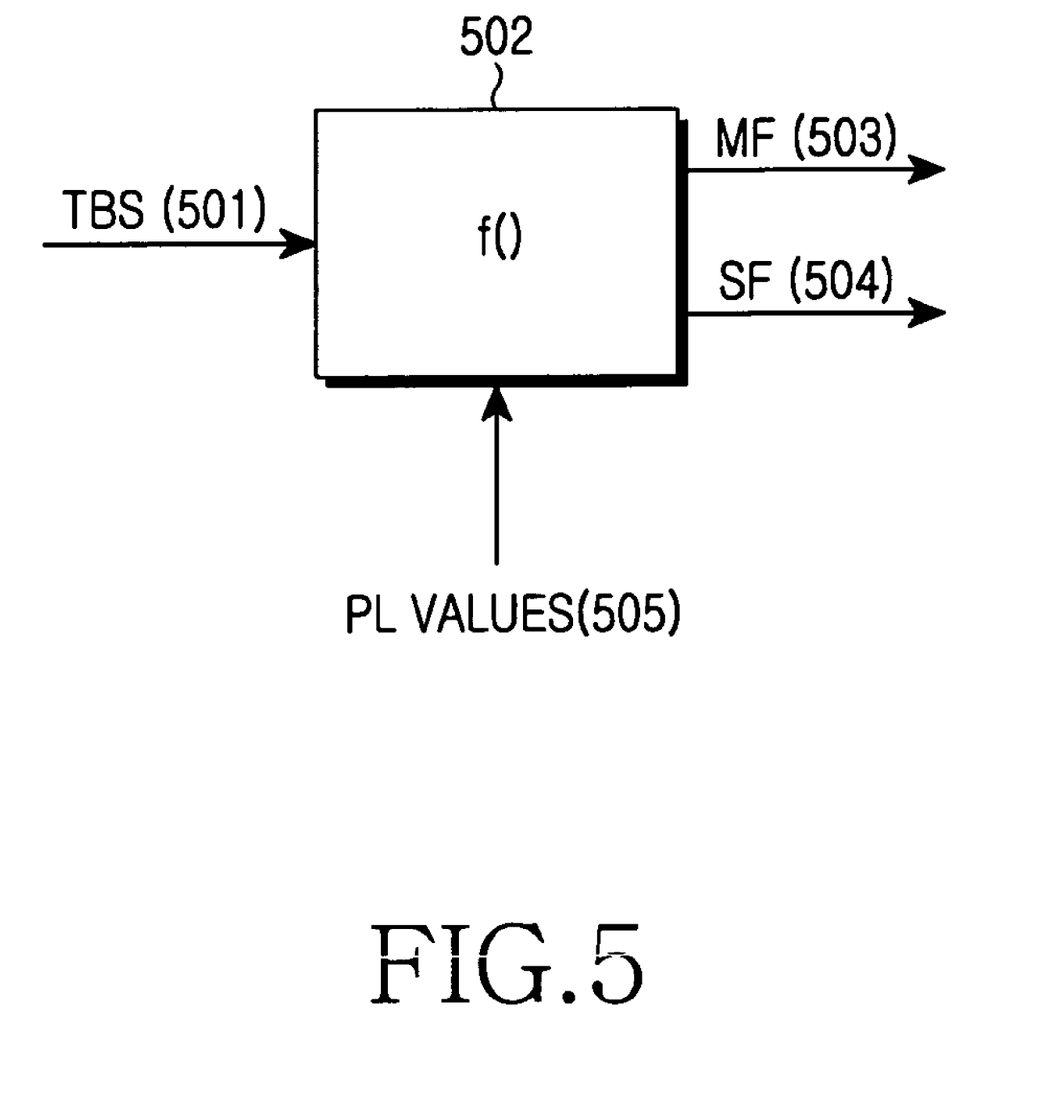
FIG. 5 illustrates the configuration of a determinator for determining a modulation format and a spreading factor, based on a TBS according to a preferred embodiment of the present invention.

FIG. 5 illustrates the configuration of a determinator for determining a modulation format (MF) and a spreading factor (SF), based on a TBS according to a preferred embodiment of the present invention. In FIG. 5, the determiner 502 receives a TBS 501 as its input, and determines an MF 503 and an SF 504 corresponding to the TBS 501 using a determination formula f( ) according to previously stored Puncturing Limit (PL) values 505. As described above, the MF 503 and the SF 504 that correspond to the TBS 501 are determined such that an MF/SF combination having a higher efficiency and requiring no puncturing if possible is used for the TBS 501. The Puncturing Limit (PL) is a parameter indicating a limit rate able to perform puncturing.

The operation for obtaining the MF and SF is performed immediately before the rate matching of the uplink transport channel. The rate matching is a procedure for repeating or puncturing transport channel data bits, which are input to the rate matching block after being encoded in each transport channel, to suit a physical channel bit size. In the uplink, a physical channel bit size transmittable with as few transport channel data bits punctured as possible is determined in each Transmission Time Interval (TTI). If the physical channel bit size is determined, the MF and SF are determined according to the determined physical channel bit size. A transport channel transmitter modulates and spreads the rate-matched transport block according to the determined MF and SF, and generates a physical channel frame having the determined physical channel bit size.

First, to obtain a physical channel bit size capable of transmitting the transport channel data, the determiner 502 estimates a data bit size to be obtained after rate matching. This data bit size is referred to as an "expected total transmit data bit size". Here, the term "total" indicates the sum of the data bits of a plurality of transport channels to be multiplexed into a single physical channel.

When a j-th TF combination (TFC) is used in an x-th transport channel, the respective data bit sizes of transport channels, which are inputs to the rate matching block, may be denoted by $N_{x,1}, N_{x,2}, \ldots N_{x,j}$. Although the rate matching is individually performed for each transport channel, the transport channels are multiplexed into a single physical channel, so that the transmittable physical channel data bit size is determined based on the total transmit data bit size to be obtained after the rate matching.

The expected total transmit data bit size is the sum of the data bits of the transport channels after the transport channel data is subjected to the rate matching. In the case where puncturing or repeating is not performed, the rate matching does not change the data bit size of each transport channel, and therefore the expected total transmit data bit size is the sum of respective data bits of all of the transport channels. However, the respective data bits of the transport channels are not multiplexed in the same manner, but are instead added to different ratios according to the importance of the transport channels. The ratios are determined based on Rate Matching attribute values "RM" signaled from the higher layers. Specifically, the ratio of data bits of the x-th transport channel to the total data bits of all of the transport channels is determined to be the ratio of a rate matching attribute value "$RM_x$" of the x-th transport channel to the minimum rate matching attribute value "min RM". Accordingly, in the case where no puncturing or repeating is performed, the expected total transport data bit size is expressed by Equation 1.

$$\frac{\sum_{x=1}^{I} (RM_x \times N_{x,j})}{\min_{1 \le x \le I} \{RM_x\}} \quad (1)$$

If there is no physical channel bit size transmittable without puncturing for the size of transport channel data to be transmitted, the rate matching block punctures the transport channel data. In the case where a maximum number of bits according to a preset Puncturing Limit (PL) are punctured, the total transmit data bit size is expressed by Equation 2.

$$PL \times \frac{\sum_{x=1}^{I} (RM_x \times N_{x,j})}{\min_{1 \le x \le I} \{RM_x\}} \quad (2)$$

The puncturing limit (PL) is a puncturing ratio limit value indicating the maximum possible puncturing ratio that guarantees the quality of the transport channel data. The PL is common to all of the transport channels.

The MF/SF determiner 502 selects a physical channel data size suitable for the data size of Equation 1 or 2, and determines a modulation format and a spreading factor corresponding to the determined physical channel data size.

A description will now be given of a method for determining an MF and an SF based on the transport channel data bit size according to embodiments of the present invention.

In the first embodiment, a puncturing limit (PL) is individually set for each of the modulation formats for the E-DCH. The reason why different PL values are set for the modulation formats is because the transmission efficiency varies depending on the modulation formats. As described above, to apply AMC in the uplink when the same transport block size is used, it is preferable to select a modulation format with the highest transmission efficiency from among the possible modulation formats such as BPSK, QPSK and 8-PSK. Even if puncturing is performed, each modulation format with puncturing to some degree has a transmission efficiency greater than that of its immediate higher-order modulation format. It is thus possible to set a puncturing limit (PL), which indicates the maximum allowed puncturing ratio, for each modulation format. Specifically, a PL corresponding to a specific modulation format is set to the maximum puncturing ratio which results in the specific modulation format having a transmission efficiency greater than that of at least its immediate higher-order modulation format. The PL values for the modulation formats are determined by experimentation, or the UE is informed of the adaptive PL values through higher layer signaling.

For example, data having the same TBS can be transmitted when the QPSK and a code rate of 3/4 through puncturing are used and when the 8-PSK and a code rate of 1/2 are used. However, it is more suitable to set the modulation format (MF) to the QPSK since QPSK transmission has a transmission efficiency greater than that of a 8-PSK transmission. Also, a preset puncturing limit $PL_{bpsk}$ for the BPSK transmission is used to determine whether the BPSK transmission, with data punctured to the maximum extent possible, provides transmission efficiency greater than that of the QPSK transmission. In addition, a preset puncturing limit $PL_{qpsk}$ for the QPSK transmission is used to determine if the QPSK transmission, with data punctured to the maximum extent possible, provides transmission efficiency greater than that of the QPSK transmission. That is, a puncturing limit, which allows each modulation format to maintain a performance greater than its higher-order modulation format, is set for each modulation format.

Puncturing is performed in a rate matching procedure for matching a transport channel bit size (i.e., transport block size) to a desired physical channel bit size. The rate matching is performed by puncturing (or repeating) transport block bits based on a corresponding Rate Matching attribute value "RM" signaled from higher layers. The rate-matched transport block size is expressed by the product of $N_{info}$ and RM. When a maximum physical channel bit size transmittable using BPSK is "$N_{max,bpsk}$" and a puncturing limit "$PL_{bpsk}$" is used, the maximum allowed transport channel bit size is the product of $1/PL_{bpsk}$ and $N_{max,bpsk}$.

Then, to optimize the transmission efficiency of the E-DCH, a modulation format for a TBS corresponding to $N_{info}$ satisfying $$"0 < N_{info} \times RM <= \frac{1}{PL_{bpsk}} \times N_{max,bpsk}"$$

is determined to be BPSK, a modulation format for a TBS corresponding to $N_{info}$ satisfying $$"\frac{1}{PL_{bpsk}} \times N_{max,bpsk} < N_{info} \times RM <= \frac{1}{PL_{qpsk}} \times N_{max,qpsk}"$$

is determined to be QPSK, and a modulation format for the remaining TBS range is determined to be 8-PSK.

According to the first embodiment, the determination formula f( ) in FIG. 5 is expressed by Equation 3. Here, an uplink packet data service is provided through I transport channels, and a Transport Format (TF) of each transport channel is determined by selecting a Transport Format Combination (TFC) from a Transport Format Combination Set (TFCS) in each Transmission Time Interval (TTI).

Interval (TTI), the UE optionally determines the set "SET0". The following is an example of the set "SET0".

$$SET0 = \{N_{256}, N_{128}, \ldots N_{minSF}, 2 \times N_{minSF}, \ldots N_{phy} \times N_{minSF}\}$$

In Equation 3, "$N_{x,j}$" denotes an encoded transport channel data bit size before rate matching (i.e., before puncturing) in the x-th transport channel using the j-th Transport Format Combination (TFC), and "$N_{data,j}$" denotes a physical channel data bit size transmittable in the j-th TFC. "$N_{max,bpsk}$" denotes a physical channel data bit size transmittable with the minimum SF when BPSK is used, which is identical to "$N_{minSF}$" in this example. "$N_{max,qpsk}$" denotes a physical channel data bit size transmittable with the minimum SF when QPSK is used. "$SF(N_{data,j})$" denotes an SF used for transmitting $N_{data,j}$.

Figure 6:
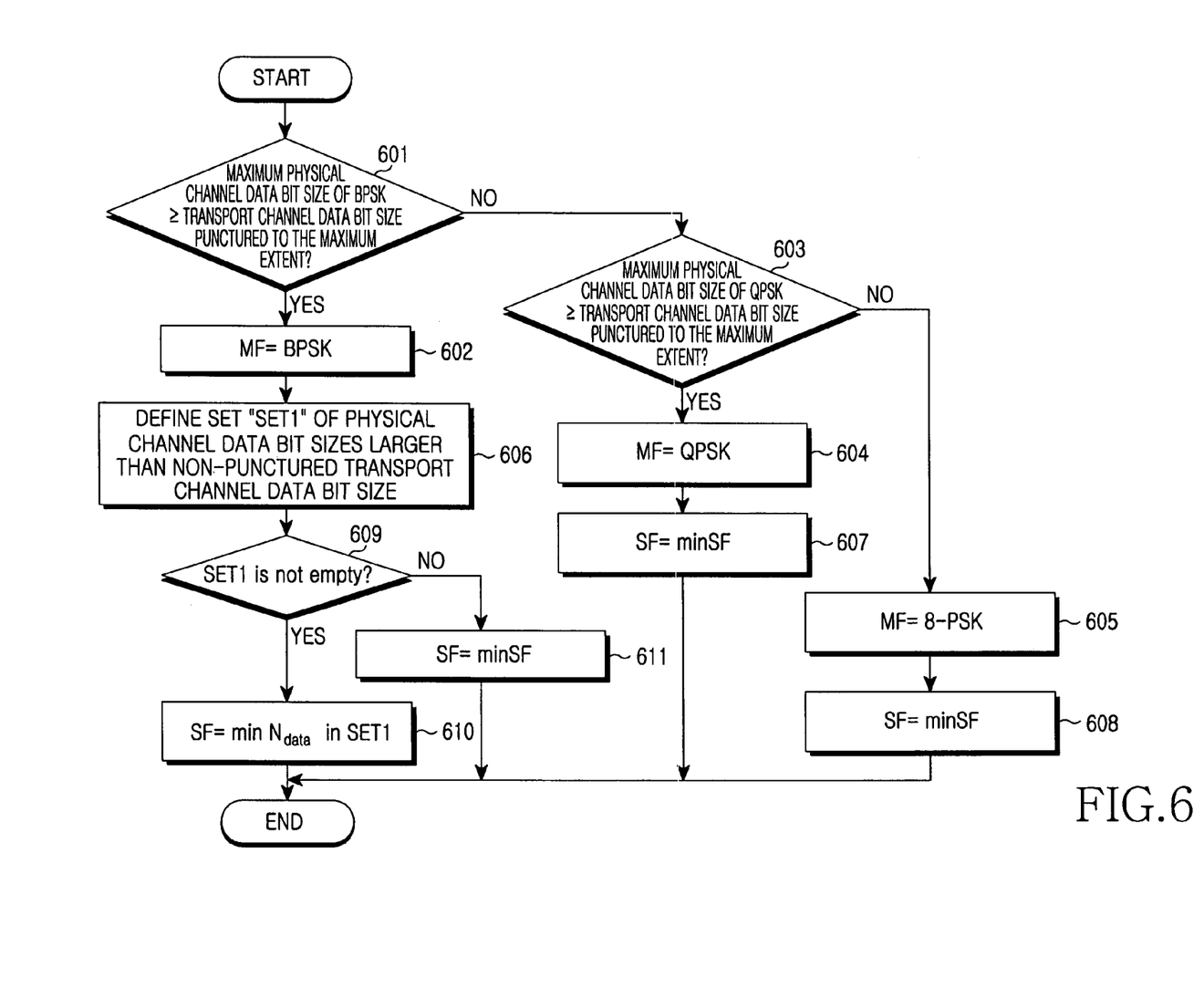
FIG. 6 is a flow chart illustrating the procedure for determining a modulation format and a spreading factor based on a TBS according to a preferred embodiment of the present invention.

FIG. 6 is a flow chart illustrating the procedure for determining the modulation format 503 and the spreading factor 504 in the determinator 502 using the transport block size 501 according to the first embodiment of the present invention. Although the description of FIG. 6 will be given only for the operation of a UE for determining the parameters (i.e., an MF and an SF) for use in transmitting the E-DCH data, a similar description may also be given for the operation of a Node B for controlling or determining the parameters (i.e., an MF and an SF) for use in receiving the E-DCH data.

In FIG. 6, at step 601, the UE determines whether or not the maximum physical channel data bit size "$N_{max,bpsk}$" when BPSK is used is greater than or equal to a transport channel (3)

$$\text{if } \left(\min_{1 \leq x \leq I} \{RM_x\}\right) \times N_{max,bpsk} - PL_{bpsk} \times \sum_{x=1}^{I} (RM_x \times N_{x,j}) \text{ is non-negative}$$

{
  MF = BPSK;

$$SET1 = \left\{ N_{data} \text{ in SET0 such that } \left(\min_{1 \leq y \leq I} \{RM_y\}\right) \times N_{data} - \sum_{x=1}^{I} (RM_x \times N_{x,j}) \right.$$

is non negative }
  If SET1 is not empty then $N_{data,j}$ = min SET1 and SF = SF($N_{data,j}$);
  else $N_{data}$ = min SF
}

$$\text{elseif } \left(\min_{1 \leq y \leq I} \{RM_y\}\right) \times N_{max,qpsk} - PL_{qpsk} \times \sum_{x=1}^{I} (RM_x \times N_{x,j}) \text{ is non-negative}$$

MF = QPSK and SF= minSF;
else, MF = 8-PSK and SF= minSF;

In Equation 3, "$RM_x$" denotes a rate matching attribute value of the x-th transport channel, which is signaled from the higher layers, and "$PL_{bpsk}$" and "$PL_{qpsk}$" denote the respective maximum puncturing bit ratios (i.e., the respective preset puncturing limits) of BPSK and QPSK. "SET0" denotes a set of all of the transmittable physical channel data bit sizes, composed of the combinations of SFs and the number of physical channels ($N_{phy}$). The minimum spreading factor (minSF) and the number of physical channels ($N_{phy}$) that constitute the set "SET0" are provided through the higher layer signaling. If the SFs and the number of physical channels usable for the E-DCH vary in each Transmission Time data bit size punctured to the maximum extent with a puncturing limit ($PL_{bpsk}$) of BPSK as shown in the above Expression 2. If the maximum physical channel data bit size "$N_{max,bpsk}$" is greater than or equal to the transport channel data bit size punctured to the maximum extent with the BPSK puncturing limit ($PL_{bpsk}$), the UE determines the modulation format (MF) of E-DCH to be BPSK at step 602. Then, at step 606, the UE defines a set "SET1" composed of physical channel data bit sizes greater than a non-punctured transport channel data bit size, which are included in the set "SET0" of all physical channel data bits sizes. Here, the non-punctured transport channel data bit size is shown in the above Expression 1.

Then, at step 609, the UE determines if the set "SET1" is empty, i.e., whether a physical channel data bit size, greater than the non-punctured transport channel data bit size, is present. If the set "SET1" is not empty, the UE determines at step 610 that a spreading factor (SF) for the E-DCH data is an SF corresponding to the minimum physical channel data bit size in the set "SET1". If the set "SET1" is empty, the UE determines, at step 611, the spreading factor for E-DCH data to be the minimum SF (minSF) in the set "SET0".

On the other hand, at step 601, if the maximum physical channel data bit size "$N_{max,bpsk}$" when BPSK is used is less than the transport channel data bit size punctured to the maximum extent as shown in the above Expression 2, the UE proceeds to step 603 to determine whether or not the maximum physical channel data bit size "$N_{max,qpsk}$" when QPSK is used is greater than or equal to a transport channel data bit size punctured to the maximum extent with a puncturing limit ($PL_{qpsk}$) of QPSK. If the maximum physical channel data bit size "$N_{max,qpsk}$" is greater than or equal to the transport channel data bit size punctured to the maximum extent with the QPSK puncturing limit ($PL_{qpsk}$), the UE determines, at step 604, the modulation format (MF) of E-DCH to be QPSK, and then determines, at step 607, the spreading factor for the E-DCH data to be the minimum SF (minSF) in the set "SET0". On the other hand, at step 603, if the maximum physical channel data bit size "$N_{max,qpsk}$" when QPSK is used is less than the transport channel data bit size punctured to the maximum extent with the QPSK puncturing limit ($PL_{qpsk}$), the UE determines, at step 605, the modulation format (MF) of the E-DCH to be 8-PSK, and then determines, at step 608, the spreading factor for the E-DCH data to be the minimum SF (minSF) in the set "SET0".

As described above, the UE determines an SF and an MF using a PL value given for each modulation format. For QPSK and 8-PSK, the SF for the E-DCH is determined to be the minimum possible SF (minSF), but various SFs can be used for BPSK. Accordingly, if the modulation format is determined to be BPSK, the UE determines that an SF enabling the transmission of data having the TBS without puncturing is the SF for the E-DCH.

For example, if an E-DCH service is provided using a single transport channel, the minimum SF "minSF" is 4, the BPSK puncturing limit "PLbpsk" is 0.5, and the QPSK puncturing limit "PLqpsk" is 0.75, and the rate matching attribute value "RM" is 1, Expression 3 is simplified to Equation 4 as follows.

$$\begin{cases} \text{If } N_{max,bpsk} - PL_{bpsk} \times N_j \text{ is non-negative} \\ \quad MF = BPSK; \\ \quad SET1 = \{ N_{data} \text{ in SET0 such that } N_{data} - N_j \text{ is non negative} \} \\ \quad \text{If SET1 is not empty then } N_{data,j} = \min SET1 \text{ and} \\ \quad SF = SF(N_{data,j}); \end{cases} \quad (4)$$

elseif $N_{max,qpsk} - PL_{qpsk} \times N_j$ is non-negative
    MF = QPSK and SF= minSF;
else, MF = 8-PSK and SF= minSF;

A description of Equation 4 is given first for the case where a transport channel data bit size $N_j$ is 500 bits. Since $N_{max,bpsk}$ is 640, $N_{max,bpsk} - PL_{bpsk} \times N_j$ is 390. Therefore, the MF for transport channel data is determined to be BPSK. A set "SET1", calculated to obtain an SF for BPSK, includes only $N_4$. Since the smallest element of the set "SET1" is a transmittable physical channel data bit size $N_{data,j}$, $N_{data,j}$ is $N_4$, and the SF for the transport channel data is determined to be 4. That is, if $N_j$ is 500 bits, the MF is determined to be BPSK and the SF is determined to be 4.

Next, if $N_j$ is 1500 bits, $N_{max,bpsk} - PL_{bpsk} \times N_j$ is −360, so that $N_{max,qpsk} - PL_{qpsk} \times N_j$ is 155. Accordingly, the MF for the transport channel data is determined to be QPSK. Since the SF for QPSK is fixed to the minimum value, the SF for the transport channel data is determined to be 4. That is, if $N_j$ is 1500 bits, the MF is determined to be QPSK and the SF is determined to be 4.

A second embodiment of the present invention will now be described.

In the second embodiment, a plurality of PL values are used when only one modulation format is used. If a supportable physical channel data bit size cannot be calculated using a first PL value, a second PL value greater than the first PL value in a puncturing rate is used to recalculate the supportable physical channel data bit size for at least one MCS level, this punctures a greater number of bits in the case where the supportable physical channel data bit size can not be calculated by means of the first PL value. The second PL value is determined in accordance with the type of the physical channel that is being used, i.e. the physical channel data bit size for the MCS level. The at least one physical channel data bit size applied by the second PL value is signaled from higher layers, or is set to a physical channel data bit size corresponding to the highest MCS level. The PL values are set to preset values or set through higher layer signaling, taking into consideration the maximum possible transfer rate.

For example, if an IR type HARQ technique is used, different bits from those of the initially transmitted packet are retransmitted when an error occurs in the initially transmitted packet, so that a larger number of bits can be punctured from transport channel data bits through rate matching. A puncturing limit PL used in a general transmission, and a puncturing limit PL_IR, that is greater than the puncturing limit PL in a puncturing rate, are used in this case.

A method for determining an MF and an SF using a plurality of PL values when BPSK is the only modulation format used for E-DCH and there are a plurality of supportable physical channels, according to the second embodiment of the present invention, is expressed by Equation 5.

$$SET1 = \left\{ N_{data} \text{ in SET0 such that } \left( \min_{1 \leq y \leq l} \{RM_y\} \right) \times N_{data} - \sum_{x=1}^{l} (RM_x \times N_{x,j}) \text{ is non-negative} \right\} \quad (5)$$

If SET1 is not empty and the smallest element of SET1 requires just one PhCH

-continued

```
then
    N_{data,j} = min SET1
else
        SET2 = { N_{data} in SET0 such that
```

$$\left(\min_{1 \leq y \leq I} \{RM_y\}\right) \times N_{data} - PL0 \times \sum_{x=1}^{I} (RM_x \times N_{x,j}) \text{ is non-negative }\}$$

```
    If SET2 is not empty
    {
        Sort SET2 in ascending order
        N_{data} = min SET2
        While N_{data} is not the max of SET2 and the follower of N_{data} requires
        no additional PhCH do
            N_{data} = follower of N_{data} in SET2
        End while
        N_{data,j} = N_{data}
    End if
}else {
    SET4 = { N_{data} in SET0 such that relates to PL1}
    SET3 = { N_{data} in SET4 such that
```

$$\left(\min_{1 \leq y \leq I} \{RM_y\}\right) \times N_{data} - PL1 \times \sum_{x=1}^{I} (RM_x \times N_{x,j}) \text{ is non-negative}\}$$

```
    N_{data} = min SET3
}
```

In Equation 5, "$RM_x$" denotes a rate matching attribute value of the x-th transport channel, which is signaled from higher layers, and "PL0" and "PL1" denote different preset puncturing limit values. "PL1" is greater than "PL0" in a puncturing rate. "$N_{x,j}$" denotes an encoded transport channel data bit size before rate matching (i.e., before puncturing) in the x-th transport channel using the j-th Transport Format Combination (TFC), and "$N_{data,j}$" denotes a physical channel data bit size transmittable in the j-th TFC. "SET0" denotes a set of all transmittable physical channel data bit sizes, composed of combinations of SFs and the number of physical channels ($N_{phy}$). The minimum spreading factor (minSF) and the number of physical channels ($N_{phy}$) that constitute the set "SET0" are provided through the higher layer signaling. If the SFs and the number of physical channels available for the E-DCH vary in each Transmission Time Interval (TTI), the UE optionally determines the set "SET0". The following is an example of the set "SET0".

$$SET0 = \{N_{256}, N_{128}, N_{64}, \ldots, N_{minSF}, 2 \times N_{minSF}, 3 \times N_{minSF}, \ldots N_{phy} \times N_{min\ SF}\}$$

"SET4" denotes a set of physical channel data bit sizes preset to be used by the PL1 or determined through the higher layer signaling. Accordingly, for example, the set "SET4" can include only the maximum physical channel data bit size related to a maximum MCS level.

The operation of a UE according to the second embodiment of the present invention will now be described with reference to Equation 5.

The UE defines a set "SET1" composed of physical channel data bit sizes larger than a non-punctured transport channel data bit size, which are included in the set "SET0" of all of the physical channel data bits sizes. If the set "SET1" is not empty, and the smallest element of the set "SET1" requires only one physical channel, the physical channel data bit size for the E-DCH is determined to be the smallest element "min SET1" of the set "SET1". If the set "SET1" is empty, or if the smallest element of the set "SET1" requires an additional physical channel, the UE defines a set "SET2" composed of physical channel data bit sizes "$N_{data}$" greater than a transport channel data bit size punctured to the maximum extent according to a puncturing limit "PL0", which are included in the set "SET0".

If the set "SET2" is not empty, the physical channel data bit size for the E-DCH is determined to be the smallest element "min SET2" of the set "SET2". If the determined physical channel data bit size is not the maximum element of the set "SET2", and an element following the determined physical channel data bit size requires no additional physical channel, the following element is finally determined to be the physical channel data bit size for the E-DCH. That is, if the set "SET2" has at least two elements, and has at least one element requiring only one physical channel, the largest of said at least one element requiring only one physical channel is determined to be the physical channel data bit size for the E-DCH.

For example, if the set "SET2" is $\{N_{16}, N_8, N_4, 2 \times N_4\}$, the smallest element is $2N_{16}$, but the following elements, $N_8$, $N_4$, use one physical channel only, so that the element "$N_4$" is finally determined to be the physical channel data bit size for E-DCH. Then, the SF is determined to be 4.

On the other hand, if the set "SET2" is empty, the UE defines a set "SET3" composed of physical channel data bit sizes "$N_{data}$" greater than a transport channel data bit size punctured to the maximum extent according to a puncturing limit "PL1" greater than the puncturing limit "PL0" in the puncturing rate, which are included in the set "SET4" including at least one physical channel data bit size as above described, and determines the physical channel data bit size for the E-DCH to be the smallest element of the set "SET3".

Figure 7:
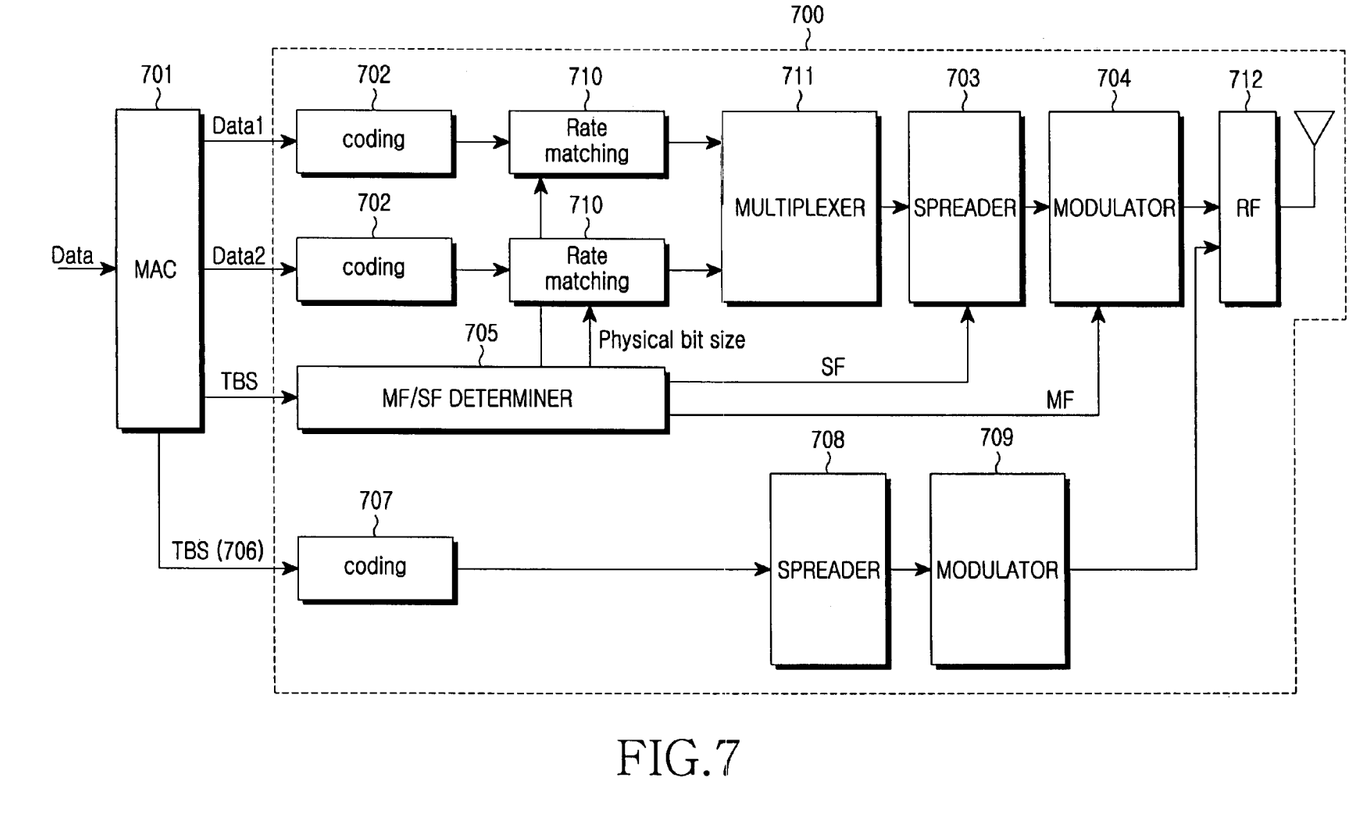
FIG. 7 is a block diagram illustrating the configuration of a UE transmitter according to a preferred embodiment of the present invention.

FIG. 7 is a block diagram illustrating the configuration of a UE transmitter that determines an MF/SF combination according to a preferred embodiment of the present invention.

In FIG. 7, a Medium Access Control (MAC) layer processor 701 determines a Transport Format Combination (TFC) for use in transmitting input data through an E-DCH, and generates data blocks according to the determined TFC. The TFC indicates the number of data blocks and the size thereof, which are determined according to a possible power level and channel state of the UE within the maximum allowed data rate set by the Node B. A transport channel data bit size (i.e., Transport Block Size (TBS)) is determined by the product of the number of the data blocks and the size thereof.

The determined TBS is provided in the form of an inner primitive to an MF/SF determiner 705 in a physical layer 700. The MF/SF determiner 705 determines a suitable MF/SF and a suitable physical channel data bit size, based on the TBS, preset rate matching attribute and PL values according to the embodiments described above. The SF and the MF are provided respectively to a spreader 703 and a modulator 704, and the physical channel data bit size is provided to rate matching units 710.

The respective data blocks of the transport channels generated by the MAC layer processor 701 are input to a multiplexer 711 via the rate matching units 710 after being encoded by coding units 702 on a transport channel-by-channel basis. The rate matching units 710 perform rate matching (i.e., puncturing) on the data blocks according to the physical channel data bit size. The multiplexer 711 multiplexes the rate-matched transport channel data. The multiplexed data has the physical channel data bit size. The spreader 703 then spreads the multiplexed data using a spreading factor (SF) determined by the MF/SF determiner 705. The modulator 704 modulates the spread data according to a modulation format (MF) determined by the MF/SF determiner 705. The modulated data is carried on a carrier wave through an RF module 712, and is then transmitted through an antenna.

On the other hand, control information containing the determined TBS is transmitted to the Node B via a coding unit 707, a spreader 708 and a modulator 709 on a control channel transmission path for E-DCH. The RF module 712 converts both the E-DCH data received from the modulator 704 and the control information of the control channel received from the modulator 709 into an RF signal, and transmits the RF signal to the Node B through the antenna.

Figure 8:
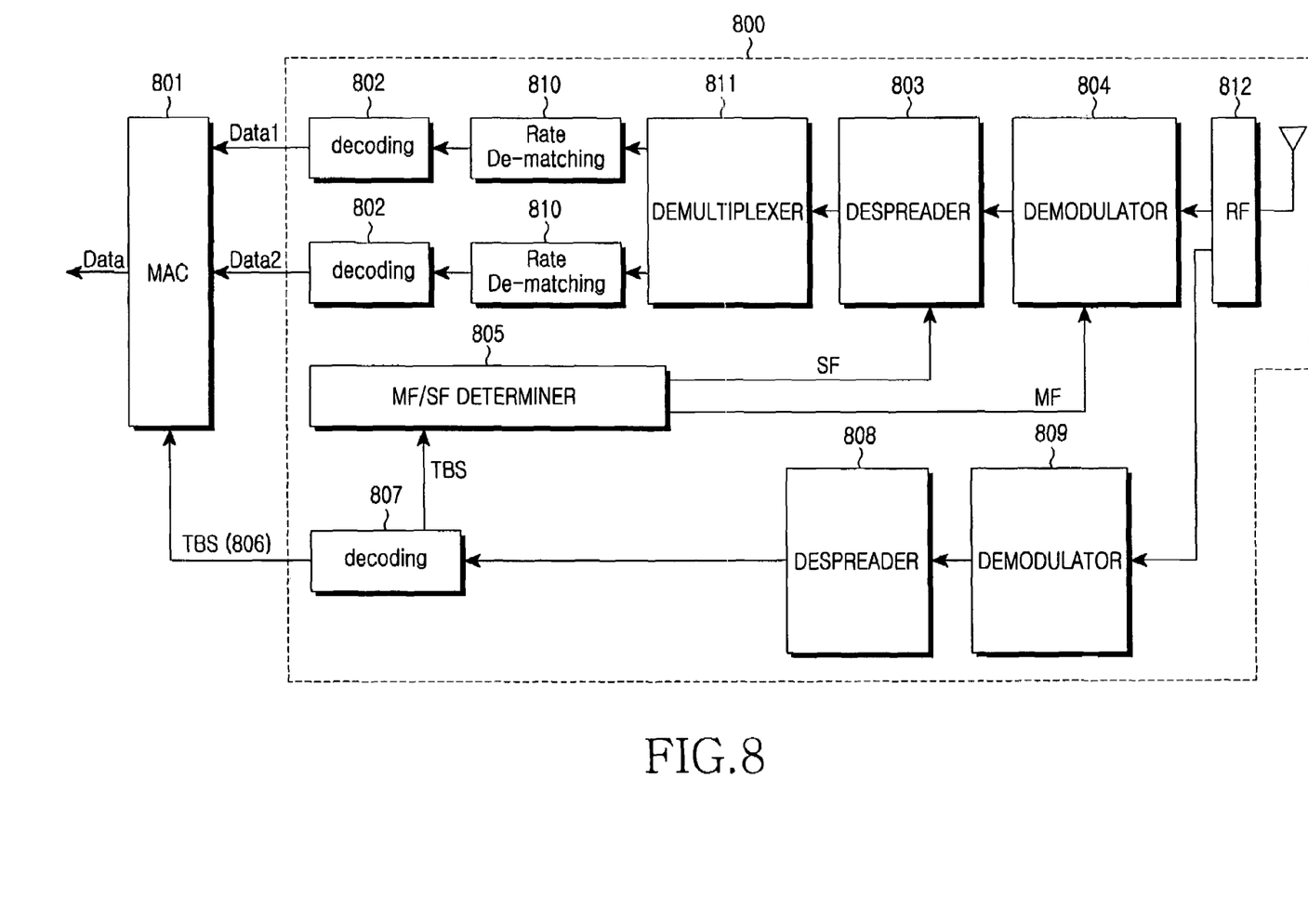
FIG. 8 is a block diagram illustrating the configuration of a Node B receiver according to a preferred embodiment of the present invention.

FIG. 8 is a block diagram illustrating the configuration of a Node B receiver that determines an MF/SF according to a preferred embodiment of the present invention.

In FIG. 8, an RF module 812 converts a signal containing the E-DCH data and the control information, received from a UE through an antenna, into a baseband signal, and provides the baseband signal to demodulators 804 and 809.

The control information is processed in the following manner. The demodulator 809 demodulates the received signal containing the E-DCH data and control information. A despreader 808 despreads the demodulated signal using a channel code of the control channel to extract a control signal from the demodulated signal. The control signal is input to a decoding unit 807. The decoding unit 807 decodes the control signal to obtain the control information and transfers the control information to a MAC layer processor 801. The control information contains a TBS of the E-DCH. The decoding unit 807 transfers the TBS to an MF/SF determiner 805. The MF/SF determiner 805 determines an MF/SF based on the TBS in the determination methods described above. The MF/SF determiner 805 then provides the determined MF and the SF respectively to the despreader 803 and a demodulator 804.

The demodulator 804 demodulates the received signal containing the E-DCH data and the control information according to the modulation format (MF) determined by the MF/SF determiner 805. The despreader 803 despreads the demodulated signal using a channel code according to the spreading factor (SF) determined by the MF/SF determiner 805, and extracts physical channel data from the demodulated signal. A demultiplexer 811 demultiplexes the physical channel data into respective data of transport channels, which are then input to decoding units 802 via rate de-matching units 810, respectively. The decoding units 802 decode the respective data of transport channels received from the rate de-matching units 810, and transfer the decoded data to the MAC layer processor 801. The MAC layer processor 801 transfers the decoded data to a higher layer.

The following is a brief description of the advantages of the exemplary method and apparatus according to the present invention as described above.

According to the present invention, when data is transmitted from a UE to a Node B through an Enhanced Uplink Dedicated Channel (EUDCH or E-DCH), Modulation Format/Spreading Factor (MF/SF) combinations are mapped one-to-one to Transport Block Sizes (TBS) of the data, and the control information, including only the TBS, is transmitted to the Node B. The Node B calculates an MF and an SF for the data received from the UE, based on the TBS included in the control information received from the UE. This maximizes uplink transmission efficiency, thus saving transmission resources, and reduces signaling overhead required to transmit the control information associated with the E-DCH.

Although the preferred embodiments of the present invention have been disclosed for illustrative purposes, those skilled in the art will appreciate that various modifications are possible, without departing from the scope and spirit of the invention as disclosed in the accompanying claims. Accordingly, the scope of the present invention should not be limited to the above embodiments, but should rather defined by the accompanying claims as well as equivalents thereof.

What is claimed is:

1. A method for providing an uplink packet data service in an asynchronous Wideband Code Division Multiple Access (WCDMA) system, the method comprising:
   checking information related to a Transport Block Size (TBS) for transmission of uplink transport channel data;
   determining a combination of a number of physical channels and a Spreading Factor (SF) based on transmittable physical channel data bit sizes and a plurality of Puncturing Limit (PL) values, the combination corresponding to the information related to the TBS; and
   transmitting the unlink transport channel data corresponding to the combination of the number of physical channels and the spreading factor.

2. The method according to claim 1, wherein the combination of the number of the physical channels and the spreading factor is determined based on a physical channel data bit size for minimizing the number of bits to be punctured, and requires no additional physical channel in transmitting the uplink transport channel data.

3. The method according to claim 1, wherein the plurality of puncturing limit values are set for a plurality of modulation formats usable for transmission of the uplink transport channel data.

4. The method according to claim 3, wherein if a maximum physical channel data bit size for Binary Phase Shift Keying (BPSK) is greater than or equal to a transport channel data bit size punctured to the maximum extent according to a puncturing limit for the BPSK, the modulation format corresponding to the information related to the TBS is determined to be the BPSK, and the spreading factor corresponding to the information related to the TBS is determined to be a spreading factor corresponding to a minimum physical channel data bit size, which is greater than or equal to a non-punctured transport channel data bit size, of the transmittable physical channel data bit sizes.

5. The method according to claim 4, wherein if all of the transmittable physical channel data bit sizes are less than the non-punctured transport channel data bit size, the spreading factor corresponding to the information related to the TBS is determined to be a spreading factor corresponding to a minimum physical channel data bit size of the transmittable physical channel data bit sizes.

6. The method according to claim 4, wherein if the maximum physical channel data bit size for the BPSK is less than the transport channel data bit size punctured to the maximum extent according to the puncturing limit for the BPSK, and the maximum physical channel data bit size for Quadrature PSK (QPSK) is greater than or equal to a transport channel data bit size punctured to the maximum extent according to a puncturing limit for QPSK, the modulation format corresponding to the information related to the TBS is determined to be the QPSK, and the spreading factor corresponding to the transport block size is determined to be a spreading factor corresponding to a minimum physical channel data bit size of the transmittable physical channel data bit sizes.

7. The method according to claim 6, wherein if a maximum physical channel data bit size when the QPSK is used is less than the transport channel data bit size punctured to the maximum extent according to the puncturing limit for the QPSK, the modulation format corresponding to the information related to the TBS is determined to be 8-PSK, and the spreading factor corresponding to the information related to the TBS is determined to be a spreading factor corresponding to a minimum physical channel data bit size of the transmittable physical channel data bit sizes.

8. The method according to claim 1, wherein the plurality of Puncturing Limit (PL) values consist of a first puncturing limit (PL) and a second Puncturing Limit (PL), and the second Puncturing Limit (PL) punctures a greater number of bits than the first PL.

9. The method according to claim 1, wherein when a first set being a subset of an initial set, which is greater than or equal to a non-punctured transport channel data bit size and requires only one physical channel, is present, the combination of the number of physical channels and the Spreading Factor (SF) is determined to be a combination of the number of physical channels and the Spreading Factor (SF) corresponding to a minimum value of the first set.

10. The method according to claim 9, wherein if the first set is not present, and if a second set being a subset of the initial set, which is greater than or equal to a transport channel data bit size punctured according to a first puncturing limit (PL), is present, the combination of the number of the physical channels and the Spreading Factor (SF) is determined to be a combination of a number of physical channels and a Spreading Factor (SF) corresponding to a largest value, which requires no additional physical channel, of the second set.

11. The method according to claim 10, wherein if the second set is not present, and the combination of the number of the physical channels and the Spreading Factor (SF) is determined based on a second Puncturing Limit (PL) and a maximum value among the initial set.

12. The method according to claim 1, wherein the combination of a number of physical channels and Spreading Factor (SF) includes a Modulation Format (MF).

13. An apparatus for providing an uplink packet data service in an asynchronous Wideband Code Division Multiple Access (WCDMA) system, the apparatus comprising:

a higher layer processor for checking information related to a Transport Block Size (TBS) for transmission of uplink transport channel data;

a determiner for determining a combination of a number of physical channels and a Spreading Factor (SF) based on transmittable physical channel data bit sizes and a plurality of Puncturing Limit (PL) values, the combination corresponding to the information related to the TBS; and a transmitter for transmitting the unlink transport channel data corresponding to the combination of the number of physical channels and the spreading factor.

14. The apparatus according to claim 13, wherein the combination of the number of the physical channels and the spreading factor is determined based on a physical channel data bit size for minimizing the number of bits to be punctured, and requires no additional physical channel in transmitting the uplink transport channel data.

15. The apparatus according to claim 13, wherein the plurality of puncturing limit values are set for a plurality of modulation formats usable for transmission of the uplink transport channel data.

16. The apparatus according to claim 15, wherein if a maximum physical channel data bit size for Binary Phase Shift Keying (BPSK) is greater than or equal to a transport channel data bit size punctured to the maximum extent according to a puncturing limit for the BPSK, the modulation format corresponding to the information related to the TBS is determined to be the BPSK, and the spreading factor corresponding to the information related to the TBS is determined to be a spreading factor corresponding to a minimum physical channel data bit size, which is greater than or equal to a non-punctured transport channel data bit size, of the transmittable physical channel data bit sizes.

17. The apparatus according to claim 16, wherein if all of the transmittable physical channel data bit sizes are less than the non-punctured transport channel data bit size, the spreading factor corresponding to the information related to the TBS is determined to be a spreading factor corresponding to a minimum physical channel data bit size of the transmittable physical channel data bit sizes.

18. The apparatus according to claim 16, wherein if the maximum physical channel data bit size for the BPSK is less than the transport channel data bit size punctured to the maximum extent according to the puncturing limit for the BPSK, and the maximum physical channel data bit size for Quadrature PSK (QPSK) is greater than or equal to a transport channel data bit size punctured to the maximum extent according to a puncturing limit for QPSK, the modulation format corresponding to the information related to the TBS is determined to be the QPSK, and the spreading factor corresponding to the information related to the TBS is determined to be a spreading factor corresponding to a minimum physical channel data bit size of the transmittable physical channel data bit sizes.

19. The apparatus according to claim 18, wherein if a maximum physical channel data bit size when the QPSK is used is less than the transport channel data bit size punctured to the maximum extent according to the puncturing limit for the QPSK, the modulation format corresponding to the information related to the TBS is determined to be 8-PSK, and the spreading factor corresponding to the information related to the TBS is determined to be a spreading factor corresponding to a minimum physical channel data bit size of the transmittable physical channel data bit sizes.

20. The apparatus according to claim 13, wherein the plurality of Puncturing Limit (PL) values consist of a first puncturing limit (PL) and a second Puncturing Limit (PL), and the second Puncturing Limit (PL) punctures a greater number of bits than the first PL.

21. The apparatus according to claim 13, wherein, when a first set being a subset of an initial set, which is greater than or equal to a non-punctured transport channel data bit size and requires only one physical channel, is present, the combination of the number of the physical channels and the Spreading Factor (SF) is determined to be a combination of a number of physical channels and a Spreading Factor (SF) corresponding to a minimum value of the first set.

22. The apparatus according to claim 21, wherein, if the first set is not present, and if a second set being a subset of the initial set, which is greater than or equal to a transport channel data bit size punctured according to a first puncturing limit (PL), is present, the combination of the number of the physical channels and the Spreading Factor (SF) is determined to be a combination of a number of physical channels and a Spreading Factor (SF) corresponding to a largest value, which requires no additional physical channel, of the second set.

23. The apparatus according to claim 22, wherein, if the second set is not present, the combination of the number of the physical channels and the Spreading Factor (SF) is determined based on a second Puncturing Limit (PL) and a maximum value among the initial set.

24. The apparatus according to claim 13, wherein the combination of a number of physical channels and Spreading Factor (SF) includes a Modulation Format (MF).

25. A method for providing an uplink packet data service in an asynchronous Wideband Code Division Multiple Access (WCDMA) system, the method comprising:
receiving control information including information related to a Transport Block Size (TBS) for receiving uplink transport channel data;
determining a combination of a number of physical channels and a Spreading Factor (SF) based on transmittable physical channel data bit sizes and a plurality of Puncturing Limit (PL) values, the combination corresponding to the information related to the TBS; and
receiving the uplink transport channel data using the number of the physical channels and the spreading factor.

26. The method according to claim 25, wherein the combination of the number of the physical channels and the spreading factor is determined based on a physical channel data bit size for minimizing the number of bits to be punctured, and requires no additional physical channel in transmitting the uplink transport channel data.

27. The method according to claim 25, wherein the plurality of puncturing limit values are set for a plurality of modulation formats usable for transmission of the uplink transport channel data.

28. The method according to claim 27, wherein if a maximum physical channel data bit size for Binary Phase Shift Keying (BPSK) is greater than or equal to a transport channel data bit size punctured to the maximum extent according to a puncturing limit for the BPSK, the modulation format corresponding to the information related to the TBS is determined to be the BPSK, and the spreading factor corresponding to the information related to the TBS is determined to be a spreading factor corresponding to a minimum physical channel data bit size, which is greater than or equal to a non-punctured transport channel data bit size, of the transmittable physical channel data bit sizes.

29. The method according to claim 28, wherein if all of the transmittable physical channel data bit sizes are less than the non-punctured transport channel data bit size, the spreading factor corresponding to the information related to the TBS is determined to be a spreading factor corresponding to a minimum physical channel data bit size of the transmittable physical channel data bit sizes.

30. The method according to claim 28, wherein if the maximum physical channel data bit size for the BPSK is less than the transport channel data bit size punctured to the maximum extent according to the puncturing limit for the BPSK, and the maximum physical channel data bit size for Quadrature PSK (QPSK) is greater than or equal to a transport channel data bit size punctured to the maximum extent according to a puncturing limit for QPSK, the modulation format corresponding to the information related to the TBS is determined to be the QPSK, and the spreading factor corresponding to the information related to the TBS is determined to be a spreading factor corresponding to a minimum physical channel data bit size of the transmittable physical channel data bit sizes.

31. The method according to claim 30, wherein if a maximum physical channel data bit size when the QPSK is used is less than the transport channel data bit size punctured to the maximum extent according to the puncturing limit for the QPSK, the modulation format corresponding to the information related to the TBS is determined to be 8-PSK, and the spreading factor corresponding to the information related to the TBS is determined to be a spreading factor corresponding to a minimum physical channel data bit size of the transmittable physical channel data bit sizes.

32. The method according to claim 25, wherein the plurality of Puncturing Limit (PL) values consist of a first puncturing limit (PL) and a second Puncturing Limit (PL), and the second Puncturing Limit (PL) punctures a greater number of bits than the first PL.

33. The method according to claim 25, wherein, when a first set being a subset of an initial set, which is greater than or equal to a non-punctured transport channel data bit size and requires only one physical channel, is present, the combination of the number of the physical channels and the Spreading Factor (SF) is determined to be a combination of a number of physical channels and a Spreading Factor (SF) corresponding to a minimum value of the first set.

34. The method according to claim 33, wherein, if the first set is not present, and if a second set being a subset of the initial set, which is greater than or equal to a transport channel data bit size punctured according to a first puncturing limit (PL), is present, the combination of the number of the physical channels and the Spreading Factor (SF) is determined to be a combination of a number of physical channels and a Spreading Factor (SF) corresponding to a largest value, which requires no additional physical channel, of the second set.

35. The method according to claim 34, wherein, if the second set is not present, the combination of the number of the physical channels and the Spreading Factor (SF) is determined based on a second Puncturing Limit (PL) and a maximum value among the initial set.

36. The method according to claim 25, wherein the combination of a number of physical channels and Spreading Factor (SF) includes a Modulation Format (MF).

37. An apparatus for providing an uplink packet data service in an asynchronous Wideband Code Division Multiple Access (WCDMA) system, the apparatus comprising:
a control channel receiver for receiving control information including information related to a Transport Block Size (TBS) for receiving uplink transport channel data;
a determiner for determining a combination of a number of physical channels and a Spreading Factor (SF) based on transmittable physical channel data bit sizes and a plurality of Puncturing Limit (PL) values, the combination corresponding to the information related to the TBS; and
a receiver for receiving the uplink transport channel data using the number of the physical channels and the spreading factor.

38. The apparatus according to claim 37, wherein the combination of the number of the physical channels and the spreading factor is determined based on a physical channel data bit size for minimizing the number of bits to be punctured, and requires no additional physical channel in transmitting the uplink transport channel data.

39. The apparatus according to claim 37, wherein the plurality of puncturing limit values are set for a plurality of modulation formats usable for transmission of the uplink transport channel data.

40. The apparatus according to claim 39, wherein if a maximum physical channel data bit size for Binary Phase Shift Keying (BPSK) is greater than or equal to a transport channel data bit size punctured to the maximum extent according to a puncturing limit for the BPSK, the modulation format corresponding to the information related to the TBS is determined to be the BPSK, and the spreading factor corresponding to the information related to the TBS is determined to be a spreading factor corresponding to a minimum physical channel data bit size, which is greater than or equal to a non-punctured transport channel data bit size, of the transmittable physical channel data bit sizes.

41. The apparatus according to claim 40, wherein if all of the transmittable physical channel data bit sizes are less than the non-punctured transport channel data bit size, the spreading factor corresponding to the information related to the TBS is determined to be a spreading factor corresponding to a minimum physical channel data bit size of the transmittable physical channel data bit sizes.

42. The apparatus according to claim 40, wherein if the maximum physical channel data bit size for the BPSK is less than the transport channel data bit size punctured to the maximum extent according to the puncturing limit for the BPSK, and the maximum physical channel data bit size for Quadrature PSK (QPSK) is greater than or equal to a transport channel data bit size punctured to the maximum extent according to a puncturing limit for QPSK, the modulation format corresponding to the information related to the TBS is determined to be the QPSK, and the spreading factor corresponding to information related to the TBS is determined to be a spreading factor corresponding to a minimum physical channel data bit size of the transmittable physical channel data bit sizes.

43. The apparatus according to claim 42, wherein if a maximum physical channel data bit size when the QPSK is used is less than the transport channel data bit size punctured to the maximum extent according to the puncturing limit for the QPSK, the modulation format corresponding to the information related to the TBS is determined to be 8-PSK, and the spreading factor corresponding to the information related to the TBS is determined to be a spreading factor corresponding to a minimum physical channel data bit size of the transmittable physical channel data bit sizes.

44. The apparatus according to claim 37, wherein the plurality of Puncturing Limit (PL) values consist of a first puncturing limit (PL) and a second Puncturing Limit (PL), and the second Puncturing Limit (PL) punctures a greater number of bits than the first PL.

45. The apparatus according to claim 37, wherein, when a first set being a subset of an initial set, which is greater than or equal to a non-punctured transport channel data bit size and requires only one physical channel, is present, the combination of the number of the physical channels and the Spreading Factor (SF) is determined to be a combination of a number of physical channels and a Spreading Factor (SF) corresponding to a minimum value of the first set.

46. The apparatus according to claim 45, wherein, if the first set is not present, and if a second set being a subset of the initial set, which is greater than or equal to a transport channel data bit size punctured according to a first puncturing limit (PL), is present, the combination of the number of the physical channels and the Spreading Factor (SF) is determined, to be a combination of a number of physical channels and a Spreading Factor (SF) corresponding to a largest value, which requires no additional physical channel, of the second set.

47. The apparatus according to claim 46, wherein, if the second set is not present, the combination of the number of the physical channels and the Spreading Factor (SF) is determined based on a second Puncturing Limit (PL) and a maximum value among the initial set.

48. The apparatus according to claim 37, wherein the combination of a number of physical channels and Spreading Factor (SF) includes a Modulation Format (MF).

* * * * *